United States Patent [19]

Raque et al.

[11] Patent Number: 5,096,052
[45] Date of Patent: Mar. 17, 1992

[54] ULTRASONIC SEALING METHOD AND ASSEMBLY

[75] Inventors: Glen F. Raque; Edward A. Robinson, both of Louisville, Ky.

[73] Assignee: Raque Food Systems, Inc., Louisville, Ky.

[21] Appl. No.: 645,576

[22] Filed: Jan. 25, 1991

[51] Int. Cl.⁵ ............................................. B65G 17/32
[52] U.S. Cl. ............................ 198/803.01; 198/803.15
[58] Field of Search ...................... 198/803.01, 803.14, 198/803.15

[56] References Cited

U.S. PATENT DOCUMENTS

| | | | |
|---|---|---|---|
| 2,949,995 | 8/1960 | Welch | 198/803.15 X |
| 3,004,651 | 10/1961 | Manspeaker | 198/803.14 X |
| 3,288,265 | 11/1966 | Smith | 198/803.14 X |
| 3,405,024 | 10/1968 | Attwood et al. | |
| 3,651,615 | 3/1972 | Bohner et al. | |
| 3,899,116 | 8/1975 | Mims | |
| 3,920,504 | 11/1975 | Shoh et al. | |
| 3,955,740 | 5/1976 | Shoh | |
| 3,971,300 | 7/1976 | Bachner | |
| 4,072,089 | 2/1978 | Bosche | |
| 4,266,933 | 5/1981 | Olsen | |
| 4,326,903 | 4/1982 | Summo | |
| 4,352,711 | 10/1982 | Toth | |
| 4,377,428 | 3/1983 | Toth | |
| 4,398,880 | 8/1983 | Seiling | 198/803.14 X |
| 4,490,961 | 1/1985 | Raque | |
| 4,498,358 | 2/1985 | Raque et al. | |
| 4,517,790 | 5/1985 | Kreager | |
| 4,529,473 | 7/1985 | Mims | |
| 4,534,818 | 8/1985 | Kreager et al. | |
| 4,618,516 | 10/1986 | Sager | |
| 4,668,316 | 5/1987 | Sager | |
| 4,786,356 | 11/1988 | Harris | |
| 4,791,775 | 12/1988 | Raque et al. | |
| 4,799,846 | 1/1989 | Wissman et al. | 198/803.15 X |
| 4,807,424 | 2/1989 | Robinson et al. | |
| 4,936,442 | 6/1990 | Von Till | 198/803.15 X |
| 4,946,028 | 8/1990 | Eichmann et al. | 198/803.15 X |
| 4,991,375 | 2/1991 | Raque et al. | 198/83.14 X |

Primary Examiner—D. Glenn Dayoan
Attorney, Agent, or Firm—Barnes & Thornburg

[57] ABSTRACT

A container carrier for supporting a container having an outer flange including first regions which have a first predetermined thickness, second regions which have a second predetermined thickness, and a top surface. The container carrier includes a carrier body having upper and lower surfaces and being formed to include an aperture for receiving the container therethrough, a portion of the upper surface of the carrier body adjacent the aperture being configured to abut the flange of the container to support the container, the portion of the upper surface also having a first depth in first sections which underlie the first regions of the flange and having a second depth in second sections which underlie the second regions of the flange, the second depth being greater than the first depth so that the top surface of the flange lies substantially in a single plane.

7 Claims, 3 Drawing Sheets

ULTRASONIC SEALING METHOD AND ASSEMBLY

BACKGROUND AND SUMMARY OF THE INVENTION

This invention relates to an assembly for sealing a sheet of covering material or covers onto containers. More particularly, the present invention relates to an improved method and assembly for sealing a sheet of material to a flange of a container in which the flange has an irregular surface or nonuniform thickness.

Containers for holding various products are often formed from paperboard or the like in a die press. The containers are formed from flat paperboard blanks which have been scored in predetermined areas to facilitate formation of the containers. The scored sections reduce the likelihood that the blank will tear as the container is formed. The containers are used to hold various products such as food.

Various types of automated systems are known for automatically filling containers moving along a predetermined path with a product such as food or the like. Individual containers which contain one or more servings of food and are sold either refrigerated or frozen are becoming increasingly popular. Such containers are typically processed on an assembly line, with the filling of the containers usually being accomplished with overhead buckets, funnels, or spouts that disburse a metered amount of the product into each individual container.

The containers are transported in metal container carriers along the assembly line in a predetermined direction. A roller chain or other suitable drive means is used to move the container carriers along the assembly line path. In some instances, a continuous sheet of material has been used to cover the containers. After the product is placed in the container, the sheet of material is sealed to the top of the containers and then cut. In other instances, individual covers may be placed on the containers before sealing. Packaging devices often use heat sealing assemblies to seal the sheet of material or covers to a flange of the containers.

Problems arise when attempting to seal the sheet of material to a top flange of the deep-drawn paperboard containers. Scored sections of the containers which are usually positioned at the corners of the containers have a thickness greater than the thickness of the nonscored regions. Difficulties arise when attempting to seal the sheet of material to the flange which has a nonuniform thickness.

One object of the present invention is to provide a method and apparatus to facilitate sealing of a sheet of material to a flange of a container when the flange has a nonuniform thickness.

According to the present invention, a method is provided for sealing a first material to a second material. The second material includes first regions having a first thickness and second regions having a second thickness greater than the first thickness. The method includes the steps of providing a support surface, providing a sealing head, and pressing the first material against the second material between the support surface and the sealing head. The method also includes the step of applying a first pulse from the sealing head to the first and second materials for a first predetermined duration to cause friction between the second regions of the second material and the first material. The method further includes the step of maintaining the sealing head in engagement with the first and second materials to clamp the first and second materials together after the first pulse ends so that the second regions of the second material bond to the first material. The method still further includes the step of applying a second pulse from the sealing head to the first and second materials for a second predetermined duration to cause friction between the non-bonded first regions of the second material and the first material to bond the first regions of the second material to the first material.

Ultrasonic pulses are used in the illustrated embodiment to seal the covering material to the flange of the containers. The ultrasonic sealing method advantageously increases the speed of sealing the covering material to the containers as compared to conventional heat sealing assemblies. In addition, as the covering material for sealing containers becomes more sophisticated, heat sealing techniques become less effective. Specifically, the cover material can be a fiberboard lid which is printed to look visually attractive. These fiberboard lids are typically somewhat insulated. Therefore, the use of heat to seal the fiberboard lid is limited by the insulation of the lid. In addition, heat can damage the inks used to print information on the lids. The ultrasonic sealing method of the present invention also permits the covering material to be sealed to the container flange through contaminants which may be on the flange or the covering material.

According to another aspect of the present invention, a container carrier is provided for supporting a container having an outer flange including first regions which have a first predetermined thickness, second regions which have a second predetermined thickness greater than the first predetermined thickness, and a top surface. The container carrier includes a carrier body having an upper surface and a lower surface. The container body is formed to include an aperture extending between the upper and lower surfaces for receiving the container therethrough. A portion of the upper surface of the carrier body adjacent the aperture is configured to abut the flange of the container to support the container in the carrier body. The portion of the upper surface has a first depth in first sections which underlie the first regions of the flange, and the portion of the upper surface has a second depth in second sections which underlie the second regions of the flange. The second depth is greater than the first depth so that the top surface of the flange lies substantially in a single plane.

Advantageously, the container carrier of the present invention permits the sealing assembly to distribute the energy from the sealing heads evenly across the surface of the flange, even in transition areas between the thick and thin regions of the material. This advantage is accomplished by matching the container carrier geometry with the geometry of the specific container. Subtle changes in the incline of the container flange can cause substantial differences in the energy distribution along the flange.

In the illustrated embodiment of the present invention, a support band is provided surrounding the aperture of the carrier for engaging the flange of the container. The support band concentrates the force from the sealing head on a smaller area of the flange which causes greater deformation of the container flange to improve the seal between the container flange and the covering material.

Additional objects, features and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying FIGURES in which.

DETAILED DESCRIPTION OF THE DRAWINGS

Figures 1, 2:
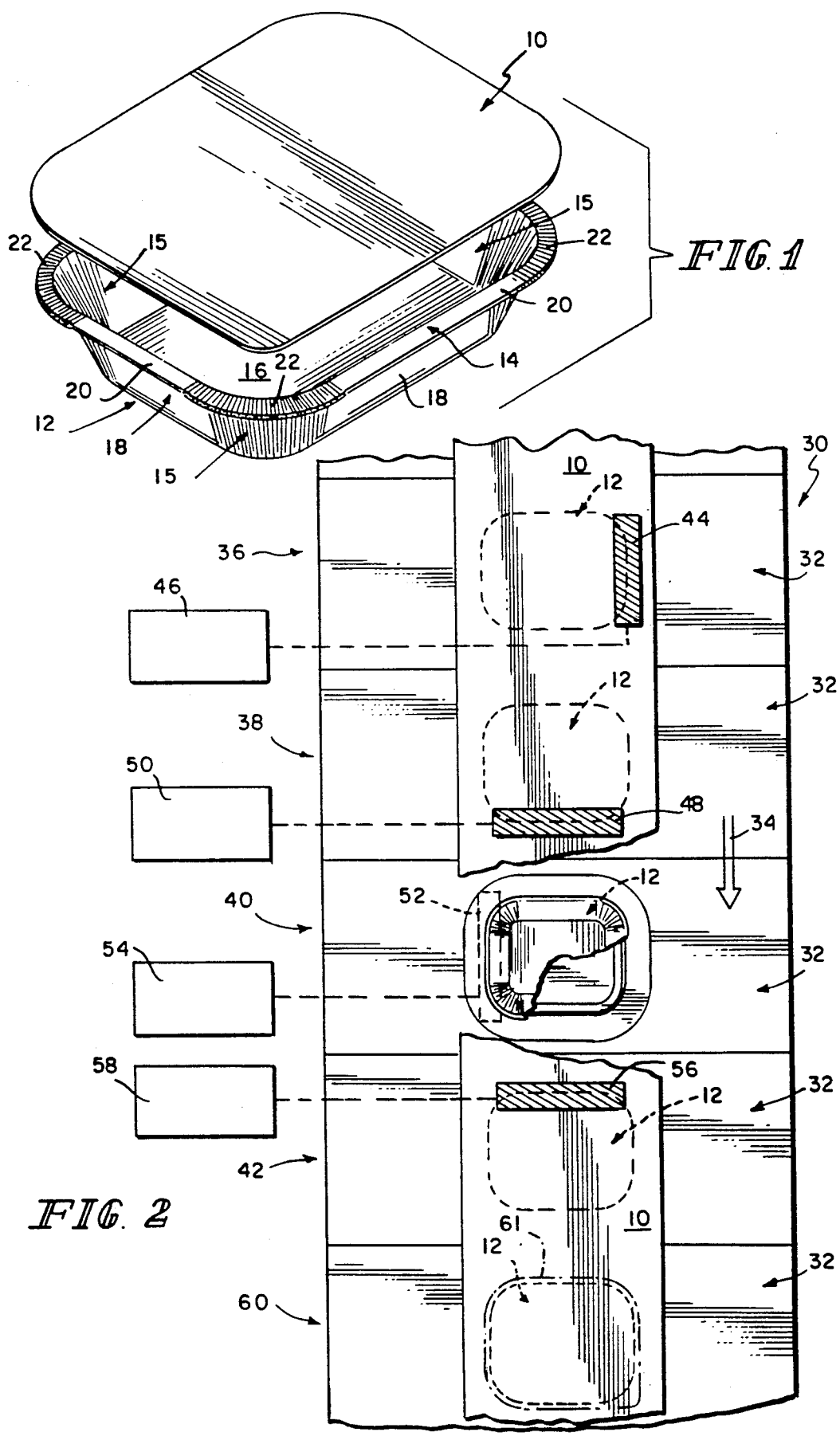
FIG. 1 is a perspective view of a container and a sheet of covering material for sealing the container.
FIG. 2 is a top sectional view with portions broken away illustrating the progressive sealing system of the present invention for sealing the sheet of covering material to the container.

The present invention relates to a method and apparatus for sealing a sheet of material such as the container cover 10 illustrated in FIG. 1 to a container 12. Container 12 is illustratively formed by stamping a flat paperboard blank in a die press (not shown). The flat paperboard blank is scored in corner regions 15 prior to stamping the container in the die press so that the corner regions 15 can be formed without tearing. The container 12 includes a flat bottom surface 16, a side wall 18, and a flange 14. Because scored sections 15 are compressed together to form the corner regions 15 of the container 12, the scored corner regions 15 are thicker than the nonscored regions of container 12. Therefore, the flange 14 of container 12 includes first regions 20 which have a first thickness and second regions 22 which have a second thickness greater than the first thickness. Illustratively, the thickness of the second regions 22 is about twice the thickness of the first regions 20. The nonuniform thickness of flange 14 creates problems when trying to seal the cover sheet 10 to the flange 14 of container 12. An air tight seal must be provided in order to extend the life of the food products located within the container 12. By having a flange 14 with a nonuniform thickness, it is difficult to seal container 12, especially in the transitional areas between the first regions 20 and the second regions 22 of the flange 14 in which the thickness changes.

The method and apparatus of the present invention is designed to seal the container covering material or sheet 10 and the nonuniform flange 14 of container 12. The progressive sealing assembly 30 of the present invention is illustrated in FIG. 2. The containers 12 are situated in container carriers 32 which transport the containers along an assembly line. In an upstream station (not shown) the containers are filled with a measured amount of a food product. The filled containers are transported to the sealing assembly 30 by suitable drive means such as a roller chain (not shown) in the direction of arrow 34. The container carriers 32 are moved intermittently so that each container carrier 32 stops in each of the four sealing stations 36, 38, 40, and 42, respectively. The sheet of material 10 is illustratively a continuous sheet which extends over the containers 12.

A first sealing head 44 is provided in first sealing station 36 for sealing of the sheet of material 10 to a first side of the flange 14 of container 12. Sealing head 44 is coupled to an ultrasonic generator 46.

The second sealing station 38 includes a second sealing head 48 for sealing a second side of flange 14 of container 12 to the sheet of material 10. Sealing head 48 is coupled to an ultrasonic generator 50.

The third sealing station 40 includes a third sealing head illustrated by broken lines 52 for sealing a third side of flange 14 of container 12 to the cover sheet of material 10. The sheet of material 10 is broken away over the third sealing station 40 to further illustrate the container 12 and the container carrier 32. The sealing head 52 is coupled to an ultrasonic generator 54.

The fourth sealing station 42 includes a fourth sealing head 56 which seals a fourth side edge of flange 14 of container 12 to the sheet of material 10. Sealing head 56 is coupled to ultrasonic generator 58. Sealing heads 44, 48, 52, and 56 and ultrasonic generators 46, 50, 54 and 58 are conventional ultrasonic equipment available from Branson Ultrasonics Corporation in Danbury, Conn.

In operation, each container 12 is progressively moved through the sealing assembly 30. Each container 12 first stops at sealing station 36 in which a first edge of flange 14 is sealed to cover sheet 10 by sealing head 44 and ultrasonic generator 46 in accordance with the method discussed below.

After the first side of flange 14 is sealed to sheet 10, the first sealing head 44 moves away from the sheet of material 10 and the container carrier 32 transports container 12 forward to the second sealing station 38. In second sealing station 38, second sealing head 48 and ultrasonic generator 50 cooperate to seal the second side of flange 14 to cover sheet 10.

After the second side of flange 14 is sealed to sheet 10, second sealing head 48 moves away from cover sheet 10 and container carrier 32 transports container 12 forward in the direction of arrow 34 to third sealing station 40. In third sealing station 40, third sealing head 52 and ultrasonic generator 54 cooperate to seal the third side of flange 14 to cover sheet 10.

After the third side of flange 14 has been sealed to sheet 10, third sealing head 52 moves away from cover sheet 10 and the container carrier 32 transports container 12 forward to the fourth sealing station 42. In the fourth sealing station 42, fourth sealing head 56 and ultrasonic generator 58 cooperate to seal the fourth side of flange 14 to the sheet of material 10. The container 12 is then completely sealed to the sheet of material 10. The fourth sealing head 56 moves away from the sheet of material 10 and the sealed container 12 is moved forward to station 60. In station 60, the cover sheet 10 is cut to a desired shape by a suitable cutting means (not shown) as illustrated by phantom line 61. It is understood that the covers 10 illustrated in FIG. 1 could be precut to the desired shape and then placed over container 12 in carriers 32. This would eliminate the continuous sheet of material as well as the need for cutting station 60.

Figure 3:
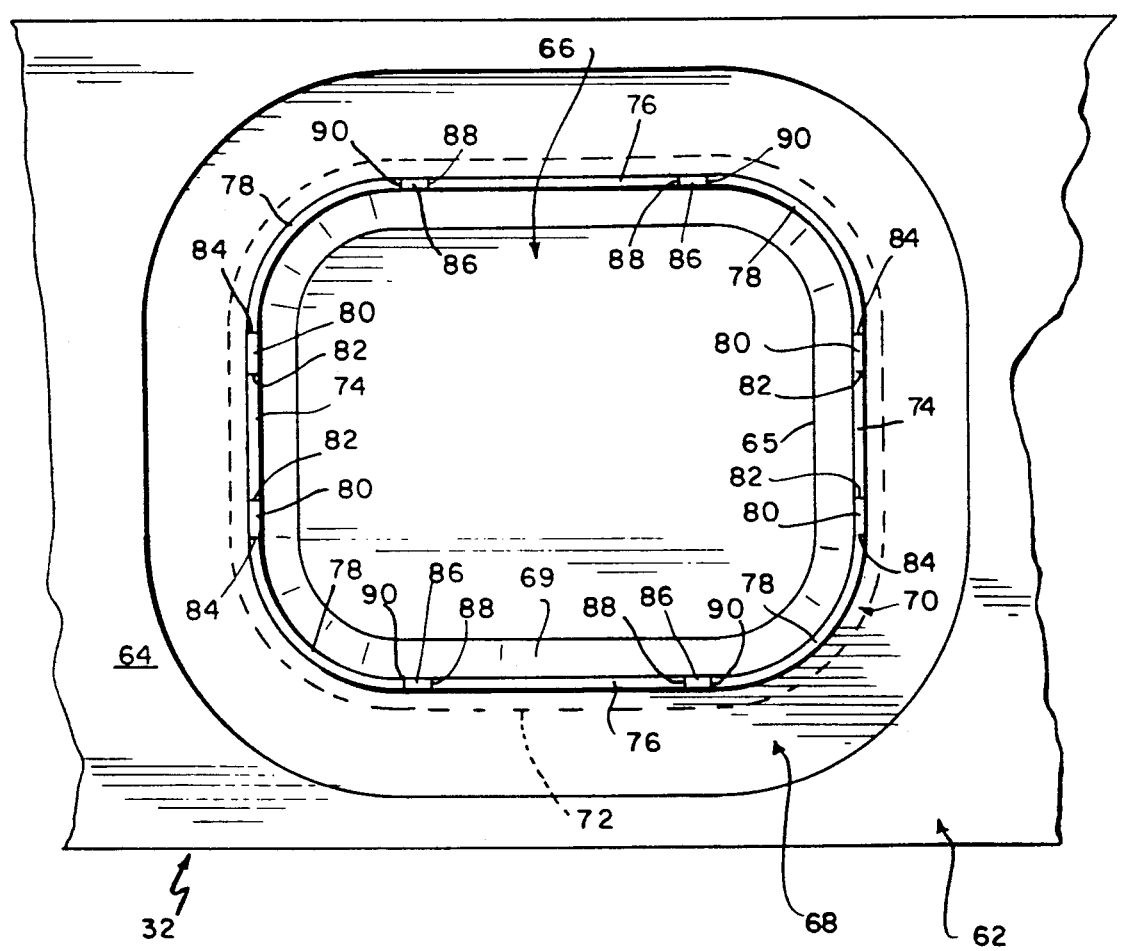
FIG. 3 is a top plan view of a container carrier of the present invention.

The container carrier 32 of the present invention is best illustrated in FIG. 3. The container carrier 32 includes a body portion 62 having an upper surface 64 and a lower surface 65 lying in a plane parallel to the plane of the upper surface 64 and spaced apart from the upper surface 64. Carrier 32 is formed to include an aperture 66 extending through body 62 for receiving the container 12 therein to support the container 12. The upper surface 64 is formed to include a recessed portion 68 surrounding the aperture 66. A sloped side wall 69 extends between upper surface 64 and lower surface 65 of carrier body 62 to define aperture 66. The side wall 69 has a slope configured to match the slope of side wall 18 of container 12 when the container is inserted into the aperture 66. An elevated support band 70 extends upwardly away from recessed portion 68. Support band 70 surrounds aperture 66 in close proximity to the aperture 66. When container 12 is located in carrier 32, the flange 14 of container 12 abuts the recessed portion 68 of upper surface 64 to support the container 12 within the carrier 32. Flange 14 extends beyond the support band 70 to about the location illustrated by broken line 72. Elevated support band 70 exerts a concentrated force on the flange 14 to help seal the flange 14 to sheet of material 10 when the sealing heads 44, 48, 52, and 56 clamp the sheet of material 10 to flange 14. In the illustrated embodiment, support band 70 is about 0.074 inch wide and extends above the recessed surface 68 by about 0.027 inch.

Container carrier 32 includes end sections 74, side sections 76, and corner sections 78. The corner sections 78 are machined deeper into carrier 32 to lie below the end sections 74 and the side sections 76. Ramp sections 80 connect opposite sides of end sections 74 to corner sections 78. Ramp sections 80 are angled downwardly beginning at locations 82 and ending at locations 84 to provide a transitional surface between end sections 74 and corner sections 78. In the embodiment of the invention illustrated in FIG. 3, the ramp sections 80 are angled at an angle of about 2.517° so that corner sections 78 of carrier 32 are situated below the end sections 74 by 0.016 inch.

Side sections 76 are connected to corner sections 78 by ramp sections 86. Ramp sections 86 extend downwardly from locations 88 to locations 90 to provide a transition surface between side sections 76 and corner sections 78. In the illustrated embodiment in FIG. 3, ramp sections 86 are angled at an angle of about 3.662° so that the corner sections 78 are situated about 0.016 inch below side sections 76. It is understood that the angles of ramp sections 80 and 86 and the distance that corner sections 78 are situated below end sections 74 and side sections 76 may be changed depending upon the configuration of flange 14 of container 12. It is understood that carrier 32 may also be used with conventional conduction heat seal assemblies or induction heat seal assemblies to improve the seal between flange 14 and material 10.

Figure 4:
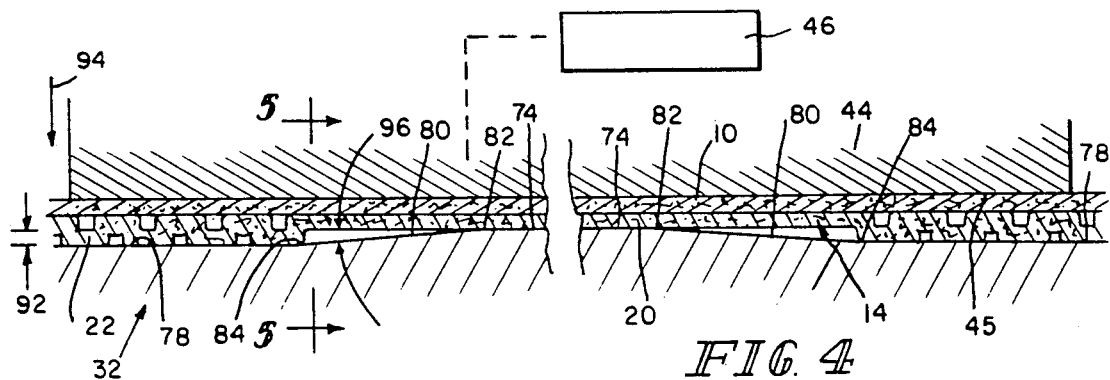
FIG. 4 is a partial sectional view taken through a sealing head and container carrier in one of the sealing stations of FIG. 2 as the sealing head seals the sheet of covering material to the container.
Figure 5:
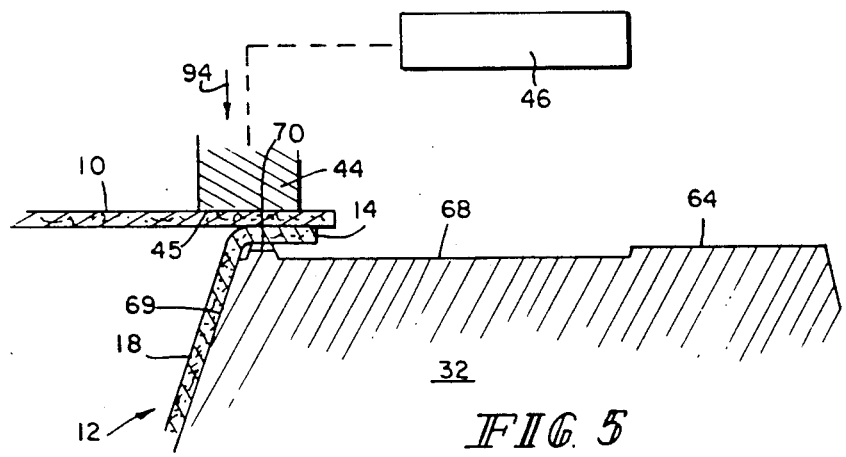
FIG. 5 is a sectional view taken along lines 5—5 of FIG. 4 further illustrating the sealing system and method of the present invention.

FIG. 4 illustrates the configuration of the sealing head 44 in first sealing station 36 as sheet of material 10 is sealed to flange 14. Sealing station 36 was selected for illustrative purposes. The remaining sealing stations 38, 40, and 42 operate in a manner identical to the first sealing station 36. As illustrated in FIGS. 4 and 5, sealing head 44 includes a sealing surface 45 which engages the sheet of material 10 and presses the sheet of material 10 against the flange 14 and the carrier 32 to clamp the sheet of material 10 to the flange 14. Ultrasonic generator 46 is coupled to sealing head 44.

The configuration of the flange is shown in detail in FIG. 4. The flange includes first regions 20 having a thickness equal to the thickness of the paperboard blank. The flange 14 also includes second regions 22 having a thickness larger than the thickness of first regions 20. The first region 20 of flange 14 is positioned to abut an end section 74 of container carrier 32. Second regions 22 of flange 14 are positioned to abut the corner sections 78 of carrier 32. Ramp sections 80 are also illustrated in FIG. 4. Ramp sections 80 are angled downwardly beginning at position 82 and ending at position 84 to provide a transitional surface between end section 74 and corner sections 78. The angle of ramp sections 80 is illustrated by arrows 96. As discussed above, ramp sections 80 are angled in an angle of about 2.517° so that corner sections 78 of carrier 32 are situated below an end section 74 by about 0.016 inch as illustrated by the dimension 92 in FIG. 4.

As illustrated in FIG. 5, support band 70 of carrier 32 engages flange 14 at a position in close proximity to side wall 18 of container 12. Support band 70 provides a narrow region of concentrated force between flange 14 and sheet of material 10 as the surface 45 of sealing head 44 clamps the sheet of material 10 against the flange 14 and carrier 32. This improves the seal between sheet of material 10 and flange 14.

In operation, the container carrier is moved into position in the first sealing station 36 to align the flange 14 below sealing head 44. Sealing head 44 then moves downwardly in the direction of arrow 94 to engage the sheet of material 10. Surface 45 presses the sheet of material 10 against the flange 14 and presses the flange 14 against the support band on the container carrier 32. Generator 46 generates an ultrasonic pulse having a predetermined duration to cause friction between the sheet of material 10 and the flange 14. During this first ultrasonic pulse, the thicker regions 22 of flange 14 have more friction with the sheet of material 10 than the first region 20 of flange 14. After the first predetermined duration, generator 46 stops generating the first pulse. Sealing head 44 is maintained in engagement with the sheet of material 10 to cold-clamp the sheet of material 10 and the flange 14 together between the surface 45 of sealing head 44 and the carrier 32. This bonds the second regions 22 of flange 14 to the sheet of material 10.

After the second regions 22 are bonded to the sheet of material 10, ultrasonic generator 46 generates a second ultrasonic pulse signal having a second predetermined duration. The bonded second regions 22 of flange 14 do not move relative to the sheet of material 10 in response to the second ultrasonic pulse. Therefore, friction occurs only between the first region 20 of flange 14 and the sheet of material 10 to bond the first region 20 to the sheet of material 10. After the second predetermined duration, ultrasonic generator 46 stops generating the second pulse. Sealing head 44 maintains engagement with the sheet of material 10 to cold-clamp the sheet of material 10 and the flange 14 together between surface 45 of sealing head 44 and carrier 32 after the second ultrasonic pulse ends to bond the first region 20 to the sheet of material 10.

The two step sealing method of the present invention advantageously provides a seal between the flange 14 having a first region 20 and a second region 22 which is thicker than the first region 20.

Figure 6:
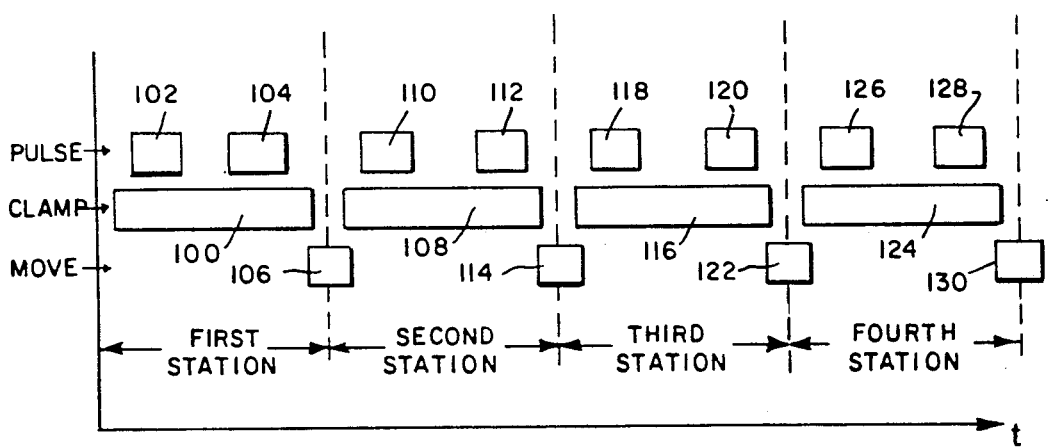
FIG. 6 is a timing diagram illustrating the steps performed during the progressive sealing of the sheet of material to the container as the container moves through the sealing system illustrated in FIG. 2.

FIG. 6 illustrates the timing diagram for a particular container 12 as it moves through each of the four stations 36, 38, 40, and 42. As illustrated in FIG. 6, sealing head 44 in first station 36 clamps the sheet of material 10 to the first side of flange 14 at a predetermined time illustrated by box 100. The first and second ultrasonic pulses from generator 46 and sealing head 44 are indicated by boxes 102 and 104. After the second ultrasonic pulse 104 ends, sealing head 44 maintains pressure on the sheet of material 10 for a predetermined time to provide an additional cold-clamp. Sealing head 44 then moves away from sheet of material 10 and container carrier 32 moves to the second station as indicated by box 106.

In second station 38, sealing head 48 moves downwardly to clamp the sheet of material 10 to flange 14 as illustrated by box 108. First and second ultrasonic pulses generated by generator 50 and sealing head 48 are indicated by boxes 110 and 112. After the end of second ultrasonic pulse 112, sealing head 48 moves upwardly away from sheet of material 10. Container carrier 32 then moves the container 12 from the second station 38 to the third station 40 as illustrated by box 114.

In third station 40, sealing head 52 clamps sheet of material 10 to flange 14 as illustrated by box 116. First and second ultrasonic pulses from generator 54 and sealing head 52 are illustrated by boxes 118 and 120. After second pulse 120 ends, sealing head 52 moves upwardly to release sheet of material 10. Container carrier 32 then moves the container 12 from third sealing station 40 to fourth sealing station 42 as illustrated by box 122.

In sealing station 42, sealing head 56 clamps the sheet of material 10 to flange 14 as illustrated by box 124. First and second ultrasonic pulses from generator 58 and sealing head 56 are illustrated by boxes 126 and 128. After the second pulse 128 ends, sealing head 56 releases the sheet of material 10. Container carrier then moves container to the next station 60 as illustrated by box 130.

Although the invention has been described in detail with reference to a certain preferred embodiment, variations and modifications exist within the scope and spirit of the invention as described and defined in the following claims.

What is claimed is:

1. A container carrier for supporting a container having an outer flange including first regions which have a first predetermined thickness, second regions which have a second predetermined thickness greater than the first predetermined thickness, and a top surface, the container carrier comprising
a carrier body including an upper surface and a lower surface, the carrier body being formed to include an aperture extending between the upper and lower surfaces for receiving the container therethrough, a portion of the upper surface of the carrier body adjacent the aperture being configured to abut the flange of the container to support the container in the carrier body, the portion of the upper surface having a first depth in first sections which underlie the first regions of the flange and having a second depth in second sections which underlie the second regions of the flange, the second depth being greater than the first depth so that the top surface of the flange lies substantially in a single plane.

2. The carrier of claim 1, further comprising a support band formed on the upper surface of the carrier body surrounding the aperture, the support band extending away upwardly from the upper surface a predetermined distance to engage the container flange.

3. The carrier of claim 2, wherein the support band has a width of less than 0.1 inch.

4. A container carrier for supporting a container having an outer flange including side regions which have a first predetermined thickness, corner regions which have a second predetermined thickness greater than the first predetermined thickness, and a top surface, the container carrier comprising
a carrier body including an upper surface and a lower surface, the carrier body being formed to include an aperture extending between the upper and lower surfaces for receiving the container therein, a support portion of the upper surface of the carrier body adjacent the aperture being configured to engage the flange of the container to support the container within the carrier body, the support portion having four side sections that underlie the side regions of the flange and the support portion having four corner sections that underlie the corner regions of the flange, the four side sections being elevated relative to the four corner sections so that the elevated side sections of the support portion of the upper surface engage the side regions of the flange and the corner sections of the support portion of the upper surface engage the corner regions of the flange when the container is situated in the container carrier.

5. The carrier of claim 4, further comprising a support band formed on the support portion of the upper surface surrounding the aperture, the support band extending upwardly away from the upper surface to engage the container flange.

6. The carrier of claim 5, wherein the support band has a width of less than 0.1 inch.

7. The carrier of claim 4, wherein the support portion of the upper surface is formed to include ramp sections extending between the elevated side sections and the corner sections, the ramp sections being formed at a predetermined angle to provide a transitional surface between the elevated side sections and the corner sections.

* * * * *